(12) United States Patent
Konishi

(10) Patent No.: US 11,187,678 B2
(45) Date of Patent: Nov. 30, 2021

(54) SOLID-LIQUID DISTRIBUTION DETECTION APPARATUS

(71) Applicant: MEIJI CO., LTD., Tokyo (JP)

(72) Inventor: Nobuyuki Konishi, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 0 days.

(21) Appl. No.: 16/760,230

(22) PCT Filed: Nov. 8, 2018

(86) PCT No.: PCT/JP2018/041434
§ 371 (c)(1),
(2) Date: Apr. 29, 2020

(87) PCT Pub. No.: WO2019/093406
PCT Pub. Date: May 16, 2019

(65) Prior Publication Data
US 2021/0190732 A1    Jun. 24, 2021

(30) Foreign Application Priority Data
Nov. 9, 2017   (JP) .............................. JP2017-216703

(51) Int. Cl.
| | |
|---|---|
| *G01N 29/22* | (2006.01) |
| *B01D 9/04* | (2006.01) |
| *G01N 29/036* | (2006.01) |
| *G01N 29/12* | (2006.01) |
| *G01N 29/44* | (2006.01) |

(52) U.S. Cl.
CPC ............. *G01N 29/222* (2013.01); *B01D 9/04* (2013.01); *G01N 29/036* (2013.01); *G01N 29/12* (2013.01); *G01N 29/225* (2013.01); *G01N 29/44* (2013.01)

(58) Field of Classification Search
CPC .... G01N 29/222; G01N 29/036; G01N 29/12; G01N 29/225; G01N 29/44
See application file for complete search history.

(56) References Cited

U.S. PATENT DOCUMENTS 4,414,841 A * 11/1983 Porenski, Jr. .......... G01N 15/06
                                                          73/61.75
4,674,057 A *  6/1987 Caughman ............. B25J 19/026
                                                          414/5
(Continued)

FOREIGN PATENT DOCUMENTS

| EP | 0 119 790 | 9/1984 |
|---|---|---|
| EP | 3 457 114 | 3/2019 |

(Continued)

OTHER PUBLICATIONS

International Search Report dated Feb. 5, 2019 in corresponding International Application No. PCT/JP2018/041434.

(Continued)

*Primary Examiner* — Tarun Sinha
(74) *Attorney, Agent, or Firm* — Wenderoth, Lind & Ponack, L.L.P.

(57) ABSTRACT

A solid-liquid distribution detection apparatus is adapted to detect a solid-liquid distribution state of a content in a solid-liquid separation column of a freeze concentration device and includes a sound source adapted to emit a sound wave to a column surface of the solid-liquid separation column, a measuring device adapted to measure a resonance waveform on the column surface of the solid-liquid separation column, and an analysis device adapted to analyze the resonance waveform measured by the measuring device and determine the solid-liquid distribution state of the content in the solid-liquid separation column based on an analysis result.

7 Claims, 1 Drawing Sheet

(56) References Cited

U.S. PATENT DOCUMENTS

| | | | |
|---|---|---|---|
| 5,264,831 | A | 11/1993 | Pfeiffer |
| 6,644,119 | B1 * | 11/2003 | Sinha .................. G01N 29/036 |
| | | | 702/103 |
| 2009/0314080 | A1 | 12/2009 | Qu et al. |
| 2012/0232803 | A1 | 9/2012 | Viola et al. |
| 2016/0205959 | A1 | 7/2016 | Kashiwagi et al. |
| 2016/0349097 | A1 | 12/2016 | Crouse |
| 2018/0116235 | A1 | 5/2018 | Kashiwagi et al. |

FOREIGN PATENT DOCUMENTS

| | | |
|---|---|---|
| JP | 47-13697 | 4/1972 |
| JP | 48-62491 | 8/1973 |
| JP | 2017-203710 | 11/2017 |
| WO | 2015/030161 | 3/2015 |
| WO | 2015/030162 | 3/2015 |

OTHER PUBLICATIONS

Extended European Search Report dated Jul. 9, 2021 in European Patent Application No. 18875641.5.
Samsuri Shafirah et al.: "Review on Progressive Freeze Concentration Designs", Chemical Engineering Communications, vol. 203, No. 3, Jan. 23, 2015 (Jan. 23, 2015), pp. 345-363, XP055818836.
Eggers F et al.: "Review Article; Broad-band ultrasonic measurement techniques for liquids", Measurement Science and Technology, IOP, Bristol, GB, vol. 7, No. 1, Jan. 1, 1996 (Jan. 1, 1996), pp. 1-19, XP020063958.

* cited by examiner

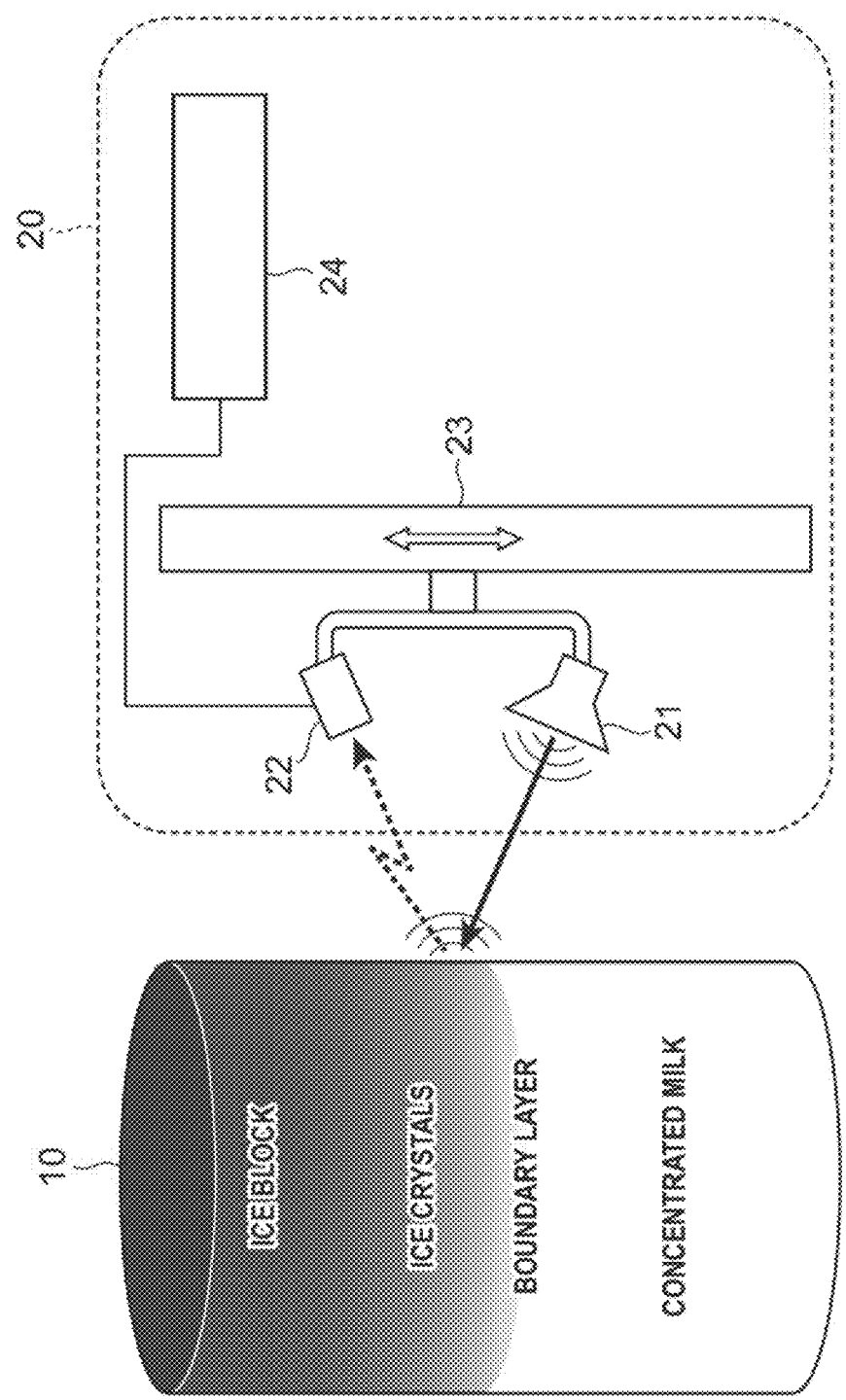

SOLID-LIQUID DISTRIBUTION DETECTION APPARATUS

TECHNICAL FIELD

The present invention relates to a solid-liquid distribution detecting apparatus that detects solid-liquid distribution of a content in a solid-liquid separation column of a freeze concentration device.

BACKGROUND ART

A freeze concentration method has been known as one of the methods of concentrating a fluid. In the freeze concentration method, a target fluid to be concentrated (i.e., a content) is stored and cooled in a solid-liquid separation column. The cooling causes ice crystals to be generated in the target fluid, and the target fluid is concentrated due to the generation of the ice crystals. These ice crystals are separated from the concentrated target fluid in the solid-liquid separation column.

The inventor of the present invention also suggests such a freeze concentration method and a method of manufacturing a concentrated product using the freeze concentration device (WO2015/030161 and WO 2015/030162).

In the solid-liquid separation column of the freeze concentration device, while ice crystals move to an upper part of the column, the target fluid concentrated due to the generation of the ice crystals moves to a lower part of the column. This is considered to be caused by a flow of the target fluid and differences in specific gravity in the solid-liquid separation column.

Generally, the part that is filled with accumulated ice crystals is referred to as an ice bed layer. In order to operate the freeze concentration device stably, it is required to appropriately control the height of the lower end of the ice bed layer in the solid-liquid separation column.

The ice bed layer refers to an area which is filled with compressed sherbet-like ice crystals that have moved upward to the upper part inside of the solid-liquid separation column due to differences in specific gravity and the flow of the target fluid in the solid-liquid separation column.

The layer of the concentrated target fluid that is not filled with ice crystals lies below the ice bed layer, and the lower end of the ice bed is in contact with the upper end of the layer of the concentrated target fluid. The control range of the height of the lower end of the ice bed is set to roughly ±10 cm of the reference position.

In the case where raw milk is concentrated using the freeze concentration method, for example, when the height of the lower end of the ice bed in the solid-liquid separation column is out of the range that is about ±10 cm of the reference position, the ice bed may collapse, and the milk solid content may leak into the separated water, thus leading to failure in the concentration operation. More specifically, a portion of the ice bed may have a hole penetrating the ice bed in the up-and-down direction, and the concentrated milk below the ice bed may flow out to the top of the ice bed through this hole, thus leading to failure in the concentration operation.

In order to operate the freeze concentration device stably, the height of the lower end of the ice bed in the solid-liquid separation column needs to be appropriately controlled.

The ice bed around its lower end in the solid-liquid separation column is a sherbet-like mixture of the ice crystals and the target fluid concentrated due to the generation of the ice crystals.

Therefore, it is extremely difficult to observe the lower end of the ice bed with human eyes, and there is a limit to the measurement accuracy when the lower end of the ice bed is monitored with human eyes. Such a necessity of a human operation prevents the freeze concentration device from being automatically operated. It is extremely difficult to visually tell the lower end of the ice bed, and the measurement accuracy is low due to a measurement error and large variations in value measured by humans. The height of the lower end of the ice bed is, however, controlled manually by an operator, and the operation of the freeze concentration device has not been automated.

There has not been an example of the automatic measurement of the height of the lower end of the ice bed even in the world.

SUMMARY OF INVENTION

Technical Problem

It is an object of the present invention to propose an apparatus for detecting solid-liquid distribution in a solid-liquid separation column in a freeze concentration device used when a freeze concentration method is performed.

Solution to Problem

[1]

A solid-liquid distribution detecting apparatus for detecting solid-liquid distribution of a content in a solid-liquid separation column of a freeze concentration device, the solid-liquid distribution detecting apparatus comprising:

a sound emitting unit adapted to emit a sound wave to a column surface of the solid-liquid separation column;

a measurement unit adapted to measure a resonance waveform on the column surface;

an analysis unit adapted to analyze the resonance waveform measured by the measurement unit; and a determination unit adapted to determine a solid-liquid distribution state of the content in the solid-liquid separation column based on an analysis result obtained by the analysis unit.

[2]

The solid-liquid distribution detecting apparatus according to [1], wherein the determination unit compares a specific resonance waveform preset according to vibration characteristics of the content that contacts an interior of the solid-liquid separation column with the resonance waveform of the sound wave analyzed by the analysis unit and determines a solid-liquid distribution state of the content in the solid-liquid separation column.

[3]

The solid-liquid distribution detecting apparatus according to [2], wherein the determination unit has the specific resonance waveform, the specific resonance waveform including a resonance waveform specific to an ice crystal layer of the content, a resonance waveform specific to a concentrated liquid layer of the content, and a resonance waveform specific to a boundary layer between the ice crystal layer and the concentrated liquid layer.

[4]

The solid-liquid distribution detecting apparatus according to any one of [1] to [3], further comprising a movement unit adapted to move the sound emitting unit and the measurement unit in a vertical direction of the solid-liquid separation column.

[5]

The solid-liquid distribution detecting apparatus according to any one of [1] to [3], wherein the sound emitting unit is adapted to emit a continuous plane sound wave with a predetermined width in a vertical direction of the solid-liquid separation column.

[6]

The solid-liquid distribution detecting apparatus according to any one of [1] to [3], wherein the sound emitting unit is adapted to emit a plurality of sound waves at predetermined intervals in a vertical direction of the solid-liquid separation column.

[7]

The solid-liquid distribution detecting apparatus according to [5] or [6], wherein the sound emitting unit includes one or more sound sources.

Advantageous Effects of Invention

Accordingly, the present invention can provide an apparatus for detecting solid-liquid distribution in a solid-liquid separation column that separates ice crystals from a target fluid concentrated due to the generation of the ice crystals in a freeze concentration device used when a freeze concentration method is performed.

BRIEF DESCRIPTION OF DRAWINGS

FIG. 1 is a view illustrating a schematic configuration of a solid-liquid distribution detecting apparatus in accordance with one embodiment of the present invention.

DESCRIPTION OF EMBODIMENTS

The inventor of the present invention has studied detecting and determining solid-liquid distribution of a content in a solid-liquid separation column of a freeze concentration device with the application of acoustic analysis technology, and found that the solid-liquid distribution can be measured using the acoustic analysis technology, whereby the present invention has been completed. The inventor of the present invention has paid attention to the feature that, when a sound wave is emitted to the solid-liquid separation column of the freeze concentration device, the resonance on the surface of the column varies depending on the vibration characteristics of the content that contacts the interior of the column. The inventor of the present invention has found that if a waveform of the resonance on the surface of the column is measured and the measured resonance waveform is subjected to predetermined acoustic analysis processing, a solid-liquid distribution state in the solid-liquid separation column can be determined based on the analysis result.

Conventionally, due to low detection sensitivity of measuring devices, it was difficult to precisely measure the resonance on the surface of the column when a sound wave is emitted thereto, and it was believed that the system of detecting solid-liquid distribution using sound waves was not practical.

In accordance with the solid-liquid distribution detecting apparatus of the present invention, it is possible to contactlessly determine a solid-liquid distribution state in a solid-liquid separation column from the outside of the solid-liquid separation column, without directly contacting ice crystals or a target fluid in the solid-liquid separation column of a freeze concentration device used for a freeze concentration method, and to appropriately and rapidly detect the height of the lower end of the ice bed. It should be noted that the application of the present invention is not limited to the measurement of the height of the lower end of the ice bed in the solid-liquid separation column of the freeze concentration device. The present invention is effective also for the measurement of particle size distribution in the column.

The solid-liquid distribution detecting apparatus in accordance with the present invention includes a sound emitting unit, a measurement unit, an analysis unit, and a determination unit. The sound emitting unit is adapted to emit a sound wave from the outside of the solid-liquid separation column without contacting the surface of the column. The sound emitting unit includes one or more sound sources disposed outside of the solid-liquid separation column. The frequency and amplitude of the sound wave emitted from the sound source may be appropriately selected depending on the material and thickness of the solid-liquid separation column, the composition, density, particle size, and the like of the particles contained in the content of the column. The sound source may be adapted to emit a continuous plane sound wave with a predetermined width in the vertical direction of the solid-liquid separation column or may be adapted to emit a plurality of sound waves at predetermined intervals in the vertical direction of the solid-liquid separation column.

The measurement unit is adapted to measure a resonance waveform on the surface of the column from the outside of the solid-liquid separation column, without contacting the surface of the column. For such a measurement unit, a measuring device of a reception type most suitable for measuring resonance on the surface of the column may be selected. For such a measuring device, a noncontact vibration measuring device, such as a capacitance type, an eddy-current type, or a laser Doppler type, may be used. Since the noncontact vibration measuring device has a high sensitivity, a fine resonance state on the surface of the column can be precisely measured. It has also been found that the sound wave detection system is effective for detecting solid-liquid distribution in the solid-liquid separation column. The sound source and the measuring device may also be integrated into a single unit or separately provided. Further, a plurality of sound sources and a plurality of measuring devices may be separately arranged at predetermined intervals in the vertical direction of the solid-liquid separation column. Alternatively, a single unit may be adapted to be moved along the vertical direction of the solid-liquid separation column by the movement unit.

The analysis unit is adapted to analyze the resonance waveform measured by the measurement unit. The analysis unit analyzes the position in the vertical direction of the solid-liquid separation column, from which a resonant wave according to the content that contacts the interior of the solid-liquid separation column comes. The analysis unit also excludes vibration noise of the solid-liquid separation column generated during the operation of the freeze concentration device from the measured waveform, and separates and extracts only the resonant wave from the sound emitting unit.

The determination unit is adapted to determine a solid-liquid distribution state of the content in the solid-liquid separation column based on the analysis result obtained by the analysis unit. The resonance on the surface of the column varies depending on the vibration characteristics of the content that contacts the interior of the solid-liquid separation column. The solid-liquid separation column includes a portion in which the ice crystals contact the interior of the solid-liquid separation column, in which a resonance waveform is specific to the ice crystals, and a portion in which a concentrated fluid contacts the interior of the solid-liquid separation column, in which a resonance waveform is specific to the concentrated fluid. More specifically, specific resonance waveform patterns are separately set in advance for the case where the content that contacts the interior of the column is the ice crystals, the case where the content that contacts the interior of the column is the concentrated fluid, and the case where the content that contacts the interior of the column is the boundary between the ice crystals and the concentrated fluid, and then the measured resonance waveform is analyzed and its characteristics are extracted. The measured resonance waveform is compared with these patterns so as to determine whether the state of the content at the measurement position in the solid-liquid separation column is the ice crystals, the concentrated fluid, or the boundary therebetween. Accordingly, the determination unit can contactlessly determine the solid-liquid distribution state of the content at the measurement position, without directly contacting the content in the solid-liquid separation column.

The solid-liquid separation column applied to the present invention may be a transparent body made of, for example, acrylic resin, which allows visible light to pass therethrough so that the interior of the column can be visually identified or may be made of metal so that the interior of the column cannot be visually identified from the outside. According to the solid-liquid distribution detecting apparatus of the present invention, even if the solid-liquid separation column is a nontransparent column made of metal such as stainless steel or made of resin such as vinyl chloride, it is possible to contactlessly determine a distribution state of the ice crystals in the column from the outside of the column, without directly contacting the ice crystals or the concentrated fluid, namely, the content inside of the column.

As compared to the typical transparent column made of acrylic resin which is generally used, the nontransparent column made of metal such as stainless steel has an excellent heat resistance and thus has an advantage in the sterilization at high temperature. Since the nontransparent column made of metal can be sterilized by high-temperature heating, microbiological control can be easily performed. Furthermore, the nontransparent column made of metal such as stainless steel has excellent durability as compared to the one made of resin or the like.

EMBODIMENT

FIG. 1 is a view illustrating a schematic configuration of a solid-liquid distribution detecting apparatus in accordance with one embodiment of the present invention.

A solid-liquid separation column 10 of a freeze concentration device has a cylindrical shape and is arranged such that the axis of the solid-liquid separation column 10 extends in the vertical direction. The content of the solid-liquid separation column 10 is divided into an ice crystal layer, a concentrated milk layer, and a boundary layer therebetween, which are aligned from top to bottom. In the solid-liquid separation column 10, ice crystals are separated from concentrated milk that has been concentrated due to the generation of the ice crystals. For the solid-liquid separation column 10, a nontransparent metal column, which prevents the interior of the column from being visually identified from the outside, is used. However, a column which partly allows visible light to pass therethrough from the outside to the inside so that the interior of the column can be visually identified, may also be used.

A solid-liquid distribution detecting apparatus 20 includes a sound source 21, a measuring device 22, an elevation device 23 adapted to vertically move one integrated unit including the sound source 21 and the measuring device 22, which are provided near the solid-liquid separation column 10, and an analysis device 24 adapted to analyze a resonance waveform measured by the measuring device 22.

The solid-liquid distribution detecting apparatus 20 is adapted to operate the elevation device at each predetermined time, emit a sound wave from the sound source 21 to the surface of the column, and measure a resonance waveform on the surface of the column when irradiated using the measuring device 22.

The analysis device 24 is adapted to analyze the resonance waveform measured by the measuring device, compare the pattern of the measured resonance waveform with the resonance waveform patterns of the ice crystal layer, the concentrated milk layer, and the boundary layer that are set in advance, and determine whether the content in the solid-liquid separation column 10 at a position corresponding to the height of the unit is the ice crystal layer, the concentrated milk layer, or the boundary layer. The analysis device 24 corresponds to the analysis unit and the determination unit of the present invention.

According to the solid-liquid distribution detecting apparatus 20, it is possible to contactlessly determine a solid-liquid distribution state of the content at a measurement position, without directly contacting the content in the solid-liquid separation column 10.

Although the embodiment of the present invention has been described in detail above, the present invention is not limited thereto, and various design changes can be made within the spirit and scope of the present invention recited in the appended claims.

REFERENCE SIGNS LIST

10 Solid-liquid separation column
20 Solid-liquid distribution detecting apparatus
21 Sound source (sound emitting unit)
22 Measuring device (measurement unit)
23 Elevation device
24 Analysis device

The invention claimed is:

1. A solid-liquid distribution detection apparatus for detecting a solid-liquid distribution state of a content in a solid-liquid separation column of a freeze concentration device, the solid-liquid distribution detection apparatus comprising:
    a sound emitting unit adapted to emit a sound wave to a column surface of the solid-liquid separation column;
    a measurement unit adapted to measure a resonance waveform on the column surface of the solid-liquid separation column;
    an analysis unit adapted to analyze the resonance waveform measured by the measurement unit; and
    a determination unit adapted to compare a specific resonance waveform preset according to vibration characteristics of the content that contacts an interior of the solid-liquid separation column with the resonance waveform analyzed by the analysis unit and determine the solid-liquid distribution state of the content in the solid-liquid separation column.

2. The solid-liquid distribution detection apparatus according to claim 1, wherein the determination unit has the specific resonance waveform, the specific resonance waveform including a resonance waveform specific to an ice crystal layer of the content, a resonance waveform specific to a concentrated liquid layer of the content, and a resonance waveform specific to a boundary layer between the ice crystal layer and the concentrated liquid layer.

3. The solid-liquid distribution detection apparatus according to claim 1, further comprising a movement unit adapted to move the sound emitting unit and the measurement unit in a vertical direction of the solid-liquid separation column.

4. The solid-liquid distribution detection apparatus according to claim 1, wherein the sound emitting unit is adapted to emit the sound wave as a continuous plane sound wave with a predetermined width in a vertical direction of the solid-liquid separation column.

5. The solid-liquid distribution detection apparatus according to claim 1, wherein the sound emitting unit is adapted to emit the sound wave as one of a plurality of sound waves at predetermined intervals in a vertical direction of the solid-liquid separation column.

6. The solid-liquid distribution detection apparatus according to claim 4, wherein the sound emitting unit includes a plurality of sound sources.

7. The solid-liquid distribution detection apparatus according to claim 5, wherein the sound emitting unit includes a plurality of sound sources.

\* \* \* \* \*